US012759175B2

(12) United States Patent
Opinel

(10) Patent No.: US 12,759,175 B2
(45) Date of Patent: Oct. 13, 2026

(54) KNIFE WITH ARTICULATED BLADE EQUIPPED WITH A CAP LIFTER

(71) Applicant: OPINEL SAS, Chambery (FR)

(72) Inventor: François Opinel, Chambery (FR)

(73) Assignee: OPINEL SAS, Chambery (FR)

( * ) Notice: Subject to any disclaimer, the term of this patent is extended or adjusted under 35 U.S.C. 154(b) by 331 days.

(21) Appl. No.: 18/408,418

(22) Filed: Jan. 9, 2024

(65) Prior Publication Data

US 2024/0227217 A1 Jul. 11, 2024

(30) Foreign Application Priority Data

Jan. 10, 2023 (FR) ...................................... 23/00252

(51) Int. Cl.
*B62B 11/00* (2006.01)
*B26B 11/00* (2006.01)
(Continued)

(52) U.S. Cl.
CPC .......... *B26B 11/001* (2013.01); *B67B 7/0411* (2013.01); *B67B 7/16* (2013.01); *B67B 2007/0458* (2013.01); *B67B 7/44* (2013.01)

(58) Field of Classification Search
CPC ......... B26B 11/001; B26B 11/00; B26B 1/04; B67B 7/16; B67B 2007/0458; B67B 7/0429; B67B 7/44
(Continued)

(56) References Cited

U.S. PATENT DOCUMENTS 2,089,536 A * 8/1937 Champlin ............. B26B 11/001 81/3.35
2,311,107 A * 2/1943 De Fraties ............. A47G 21/06 30/143
(Continued)

FOREIGN PATENT DOCUMENTS

DE 647844 C * 7/1937
EP 0 860 396 A1 8/1998
(Continued)

OTHER PUBLICATIONS

Opinel Corkscrew & Bottle Opener Knife Found at: https://bluecashewkitchen.com/products/no-10-corkscrew-bottle-opener-knife?srsltid=AfmBOorlbZxCIJG536KHtVVGOERLMZ6Be4LzMShkoKDC8UjpJ2EQYK-6 (Year: 2026).*
(Continued)

*Primary Examiner* — Mahdi H Nejad
(74) *Attorney, Agent, or Firm* — Rothwell, Figg, Ernst & Manbeck, P.C.

(57) ABSTRACT

The invention relates to a knife comprising a handle of longitudinal axis and a blade rotatably mounted at a first longitudinal end of the handle, between a position deployed outside the handle and in alignment thereof, and a position folded in a space provided in the handle, the knife further comprising a cap lifter, the cap lifter being placed at a second longitudinal end of the handle, the cap lifter comprising a wire structure mounted to freely rotate about an axis orthogonal to the longitudinal axis of the handle, the wire structure defining with the handle a closed contour delimiting a cap lifting aperture intended to receive a capsule, and in that the cap lifter comprises a bearing element allowing the bearing of the cap lifter on an upper part of the capsule, said bearing element being formed by a bearing zone of the handle, and a hooking element allowing
(Continued)

the hooking of the cap lifter under the capsule, said hooking element being formed by a rectilinear transverse portion of the wire structure.

9 Claims, 6 Drawing Sheets

(51) Int. Cl.
*B67B 7/04* (2006.01)
*B67B 7/16* (2006.01)
*B67B 7/44* (2006.01)

(58) Field of Classification Search
USPC ................ 7/118, 155; 81/3.09, 3.55; 30/155
See application file for complete search history.

(56) References Cited

U.S. PATENT DOCUMENTS 4,409,864 A * 10/1983 Gaskins .................... B67B 7/16 81/3.55
4,805,250 A * 2/1989 Dugas ................... B26B 11/001 30/155
6,101,900 A 8/2000 Traspuesto Miguel
2003/0110572 A1 6/2003 Percival
2011/0179581 A1 * 7/2011 Hunkele ............... B26B 11/001 7/118

FOREIGN PATENT DOCUMENTS

FR 2519957 A1 * 7/1983 ............... B67B 7/16
FR 3144769 A1 * 7/2024 ............... B67B 7/16

OTHER PUBLICATIONS

Bottle Cap Opener for Sealing Inlet of Container, Has Support Portion Vertically Orthogonal to Neck Portion of Container and Supported Vertically on Neck Portion of Container From End Portion of Inclined Portion Document ID:KR 2122879 B1; Date Published: Jun. 15, 2020 Inventor: Lee S K (Year: 2020).*

* cited by examiner

KNIFE WITH ARTICULATED BLADE EQUIPPED WITH A CAP LIFTER

CROSS REFERENCE TO RELATED APPLICATION(S)

The present application claims the benefit of priority to French Application No. 23/00252, filed Jan. 10, 2023, the disclosure of which is incorporated herein by reference in its entirety.

TECHNICAL FIELD

The present invention concerns a hand instrument of the knife type, including a handle and a blade articulated on the handle, the blade being retractable in an interior space of the latter and capable of being used substantially in the longitudinal axis of the handle. It relates more particularly to such a knife equipped with a cap lifter.

BACKGROUND

Knives including at least one additional tool such as a screwdriver, punch or the like are known.

For example, the best known is a hand instrument usually called a «Swiss army knife», including a block forming a handle. On the latter several tools such as scissors, file, punch blade, screwdriver, corkscrew, USB key, etc. are mounted in an articulated manner along a transverse axis.

It is particularly known to use a cap lifter as a tool. A cap lifter is a small instrument designed to open bottles closed with metal caps by deforming them.

There are two main types of cap lifters: blade or lip cap lifters and fork, claw, tooth or hook cap lifters.

The blade or lip cap lifters consist of a handle pierced at one end with a rectangular hole sufficient to allow the partial passage of the capsule. The operator must engage the capsule in the lumen, so that the blade bears under the crown and its opposite side rests in the center of the capsule. By pressing from bottom to top, the blade drives a few teeth, which deforms the metal and releases the clamped glass neck.

The fork, claw, tooth or hook cap lifters are made up of a small metal blade with a cut tip opposite a bearing point. The whole forms a kind of a rigid clamp. The operator engages the tip under one of the folds of the collar and places the opposite edge in the center of the capsule. As for the blade or lip cap lifters, the cap lifting is carried out by pressure from bottom to top. This type of cap lifter is frequently used in «Swiss army knife» type multi-blade knives.

SUMMARY

The invention proposes a knife with an articulated blade equipped with an improved cap lifter, allowing easy positioning of the cap lifter on the capsule and an easy cap lifting.

The subject of the invention is therefore a knife comprising a handle with a longitudinal axis and a blade rotatably mounted at a first longitudinal end of the handle, between a position deployed outside the handle and in alignment thereof, and a position folded into a space provided in the handle.

In accordance with the invention, the knife further comprises a cap lifter, the cap lifter being placed at a second longitudinal end of the handle, the cap lifter comprising a wire structure mounted to freely rotate about an axis orthogonal to the longitudinal axis of the handle, the wire structure defining with the handle a closed contour delimiting a cap lifting aperture intended to receive a capsule, and the cap lifter comprises a bearing element allowing the bearing of the cap lifter on an upper part of the capsule, said bearing element being formed by a bearing zone of the handle, and a hooking element allowing the cap lifter to be hooked under the capsule, said hooking element being formed by a rectilinear transverse portion of the wire structure.

Thus, the use of a wire structure mounted to freely rotate about the handle and provided with a rectilinear transverse portion makes it possible to easily and securely position the cap lifter on the capsule and then easily carry out the cap lifting.

The bearing zone of the handle may be a flat surface of the handle, arranged at the second longitudinal end of the handle and inclined relative to the longitudinal axis of the handle.

The wire structure can be made of bent metal wire.

Preferably, the wire structure is flat, and the wire is of circular section.

The diameter of the wire is advantageously less than 3 mm.

Preferably, the diameter of the wire is comprised between 1.5 and 1.8 mm.

The wire structure can successively comprise, from the second longitudinal end of the handle and moving away longitudinally from said second longitudinal end: a) two transverse end portions each engaged in a transverse housing of the handle, b) two longitudinal portions each connected upstream to a transverse end portion, c) two portions inclined towards the longitudinal axis of the handle and each connected upstream to a longitudinal portion, and d) said rectilinear transverse portion which is connected to the two inclined portions.

The knife may comprise a first ferrule, called a fixed ferrule, in the form of a split ring, fitted to the first end of the handle and crossed by a rotation rod on which the blade is rotatably mounted, and a second ferrule, called a rotating ferrule, in the form of a split ring, arranged at the first end of the handle at the level of the axis of rotation of the blade, concentrically with the fixed ferrule, and capable of rotating on itself along the longitudinal axis of the handle.

The knife may comprise a storage recess in which a corkscrew is arranged.

The invention also relates to the use of a knife described above for the cap lifting of a bottle.

BRIEF DESCRIPTION OF THE DRAWINGS

Other characteristics and advantages of the present invention will appear on reading the detailed description below, of a non-limiting example of implementation, made with reference to the appended figures in which.

DETAILED DESCRIPTION

Figure 1:
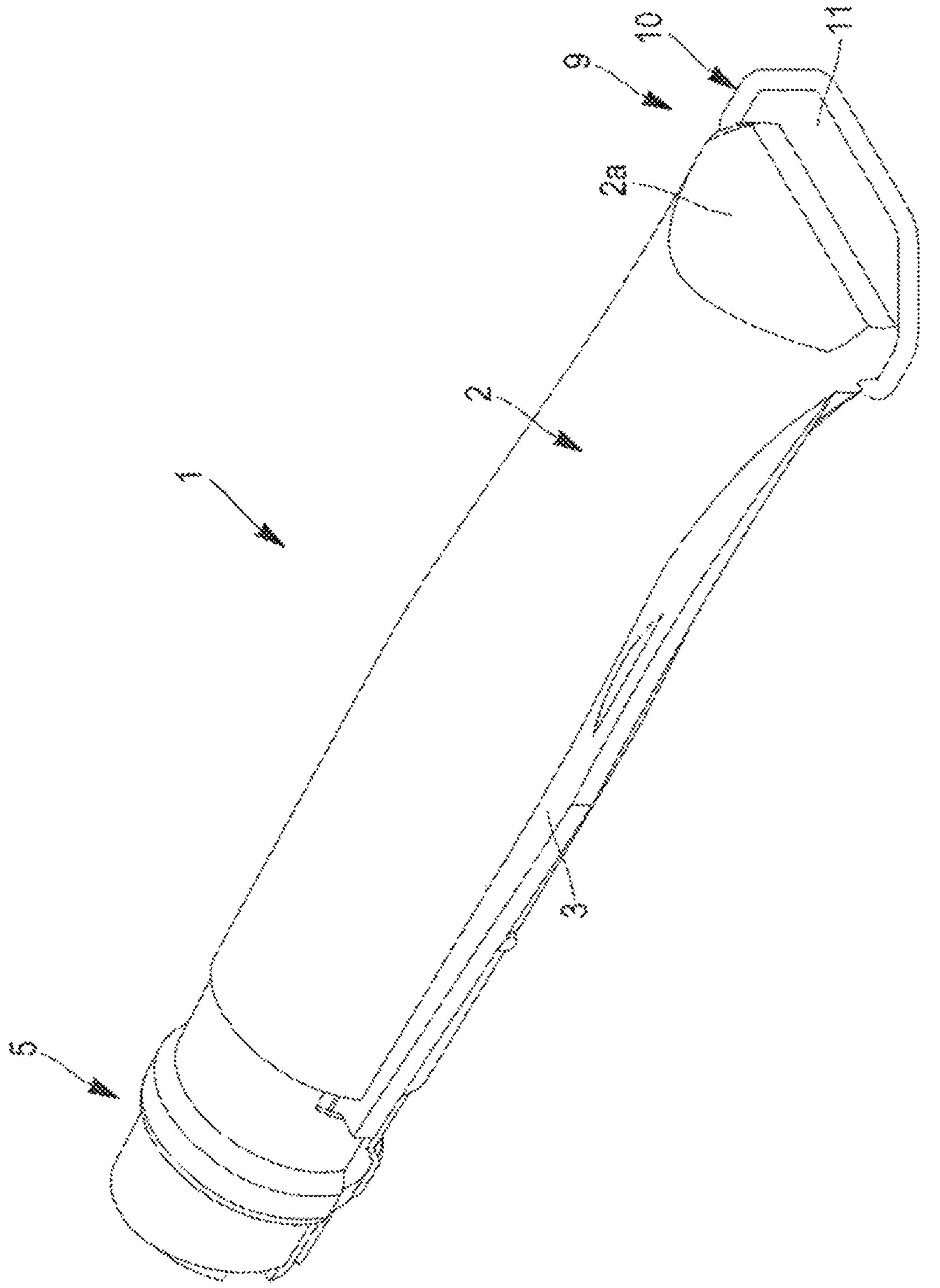
FIG. 1 is a general perspective view of a knife according to the invention.
Figure 2:
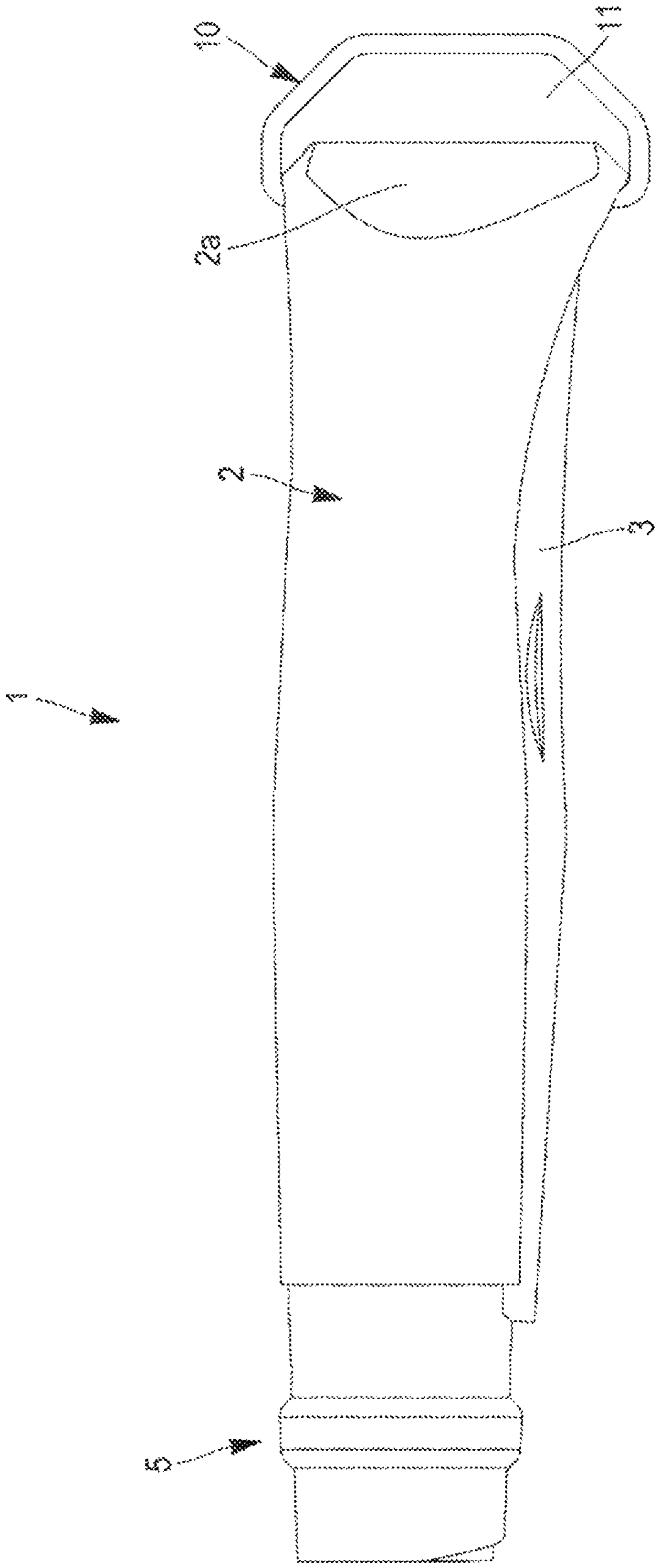
FIG. 2 is a top view of the knife of FIG. 1.

As illustrated in FIGS. 1 to 5, a knife 1 according to the invention, of the folding blade knife type, comprises a handle 2, made of wood or plastic material such as polyamide (with a filler such as fiberglass), and a blade 3 foldable into the handle 2. The blade 3 is rotatably mounted on a rotation rod 4 passing through the handle 2.

A ferrule system 5, placed at a first end of the handle 2, allows, using a rotary ring along the longitudinal axis of the handle, to block the blade 3 in position once it has been deployed for use.

Figure 5:
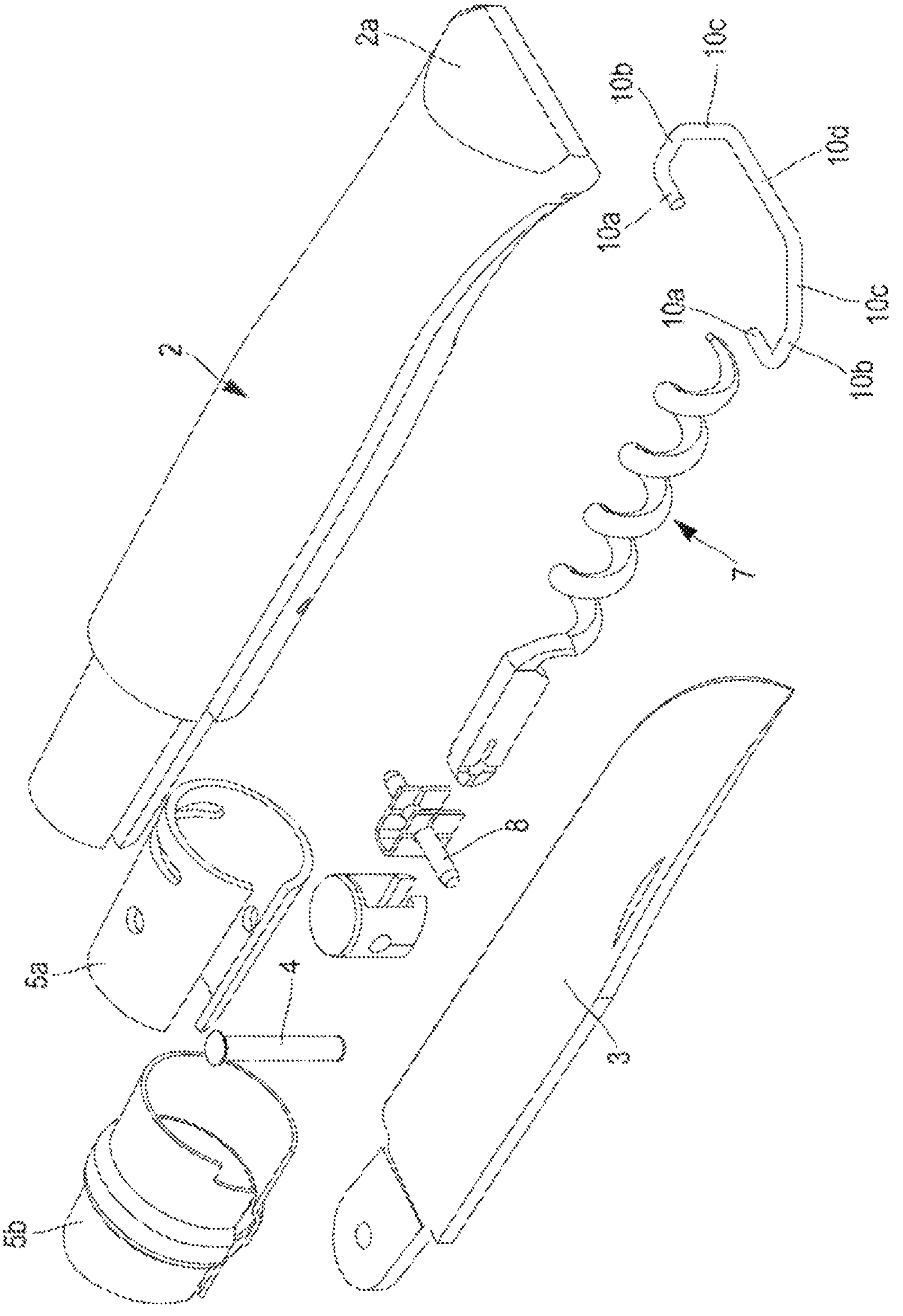
FIG. 5 is an exploded perspective view of the knife of FIG. 1.

A first ferrule 5*a*, called a fixed ferrule, in the form of a split ring, is fitted to the end of the handle 2 and is crossed by the articulation axis of the blade on the handle 2. A second ferrule 5*b*, called a rotating ferrule, is also in the form of a split ring, is arranged concentrically with the fixed ferrule 5*a* (at the end of the handle at the level of the axis of rotation of the blade), and capable of rotating on itself, according to the longitudinal axis of handle 2 (FIG. 5).

The slot provided on each ferrule 5*a*, 5*b* allows the blade 3 to pass from the folded position (in the handle 2) to the deployed position and vice versa.

In order to block the blade 3 in the deployed position of use, for safety reasons, the user rotates the rotating ferrule 5*b*, which causes the proximal part of the blade 3 (towards the handle 2) to bear against the distal periphery of the ferrule, preventing the pivoting of the blade 3 and therefore maintaining it in position.

Figure 3:
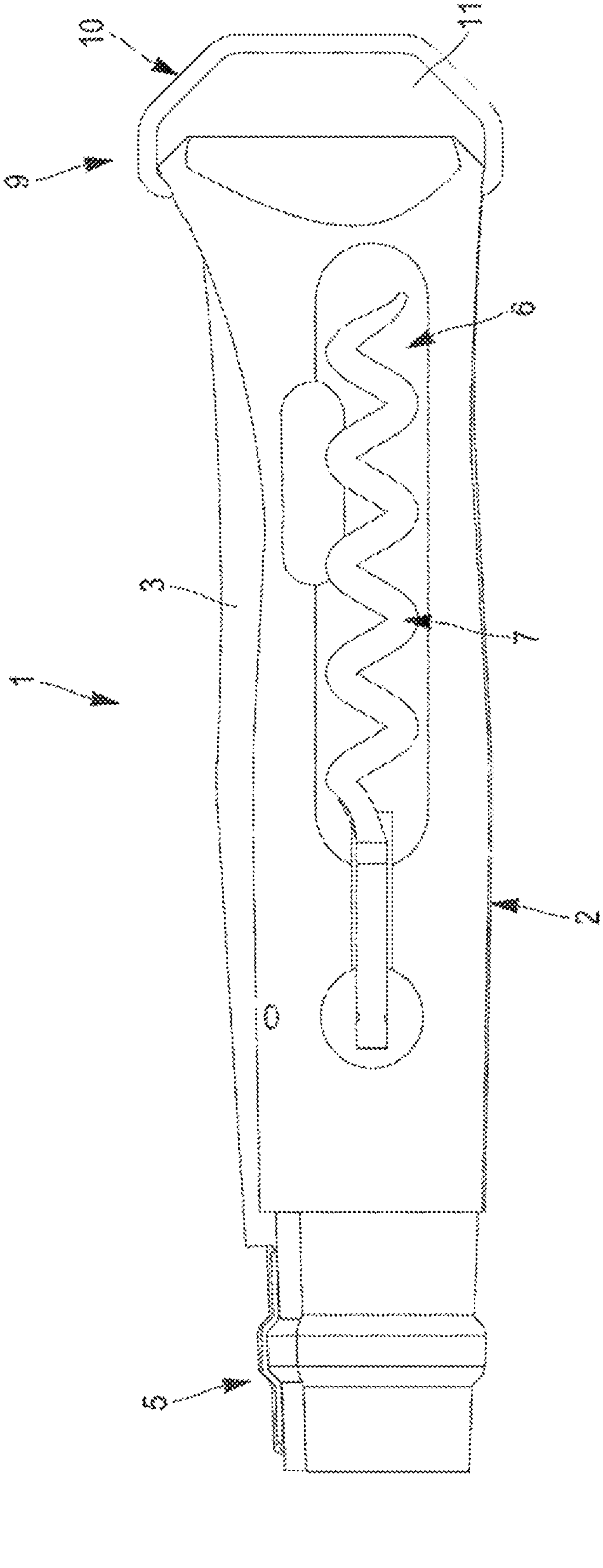
FIG. 3 is a bottom view of the knife of FIG. 1.

The handle 2 advantageously comprises a lateral recess 6, of elongated shape and arranged along the longitudinal axis of the handle 2, arranged laterally on the handle 2 and open to the outside over its entire length (FIG. 3).

In the recess 6 is arranged a corkscrew 7 which is rotatably mounted on a rotation rod 8 transverse to the axis of the handle 2. The rotation rod 8 of the corkscrew 7 is orthogonal to the rotation rod 4 of the blade 3.

In accordance with the invention, the knife 1 comprises, at the second end of the handle 2, a cap lifter 9.

The cap lifter 9 comprises a wire structure consisting of a wire 10, which is for example metallic, and typically made of stainless steel. The wire 10 advantageously extends in a plane and is folded so as to define with the end of the handle 2 a closed loop which delimits a cap lifting aperture 11.

The wire structure 10 is advantageously symmetrical with respect to the longitudinal axis of the handle 2.

Figure 4:
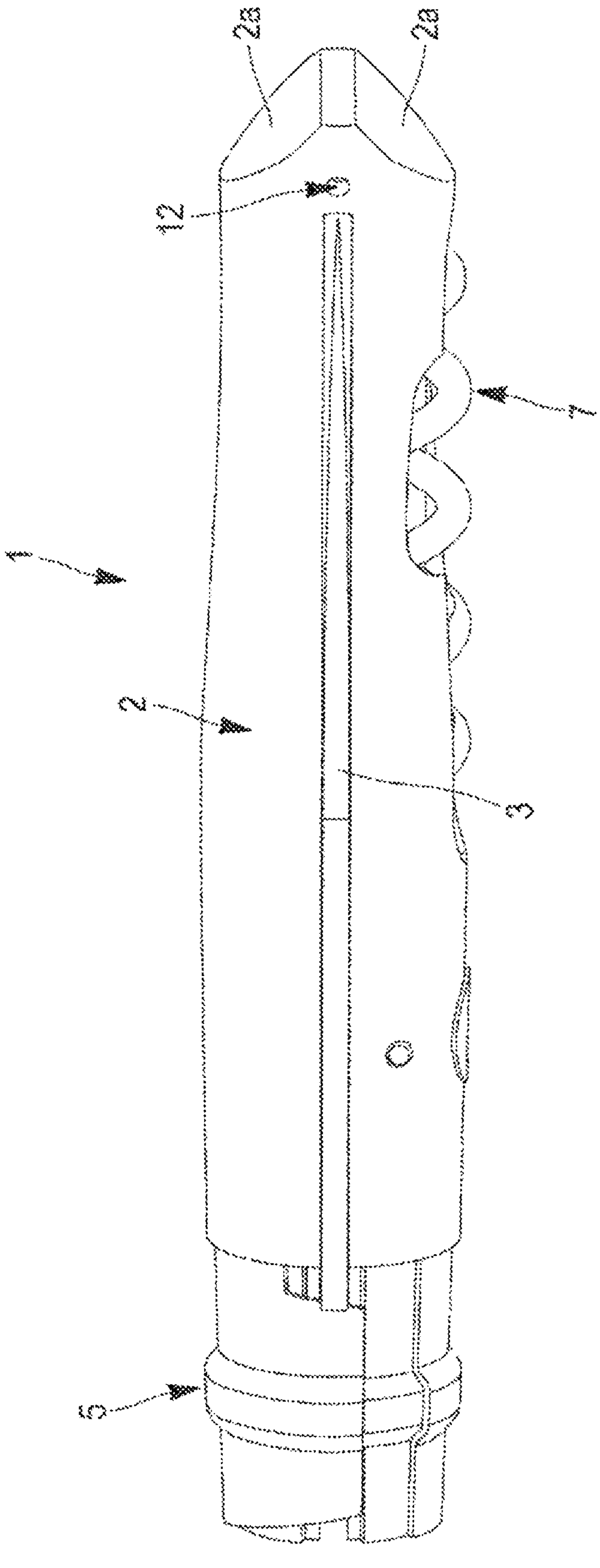
FIG. 4 is a lateral view of the knife of FIG. 1, without the wire structure of the knife.

The wire 10 comprises in particular two transverse end portions 10*a*, which constitute two studs which are engaged radially in two corresponding housings (drillings) 12 of the handle 2. The two housings 12 are aligned and define the axis of rotation of the wire structure, said axis being orthogonal to the longitudinal axis of the handle 2 (FIG. 4).

In the embodiment illustrated in FIG. 5, the two transverse end portions 10*a* of the wire 10, proximal relative to the handle 2, each extend towards the outside of the handle by a longitudinal portion 10*b*, then by an inclined portion 10*c*. The inclined portions 10*c* connect the longitudinal portions 10*b* to a distal transverse portion 10*d*, in the direction of the axis of the handle 2. Thus, the length of the transverse portion 10*d* is less than the distance between the two longitudinal portions 10*b*.

The transverse end portions 10*a* and the longitudinal portions 10*b* substantially delimit a rectangle, while the inclined portions 10*c* and the central transverse portion 10*d* substantially delimit an isosceles trapezoid.

The transverse end portions 10*a*, the longitudinal portions 10*b*, the inclined portions 10*c* and the central transverse portion 10*d* are advantageously rectilinear.

Alternatively, the longitudinal portions 10*b* and the inclined portions 10*c* can be curved or aligned.

The cap lifting aperture 11, delimited by the wire structure 10 and by the handle 2, is intended to accommodate part of a bottle cap.

A bottle cap is typically of the crown cap type. A crown cap is intended to close a bottle neck whose edge has a semi-toric shape retainer or a thread having at least one undercut. The crown cap is mainly made up of a metal disc, placed on the neck concentrically with the latter, whose flanges are folded laterally to crimp it onto the retainer, forming a notched crown.

The rectilinear transverse portion 10*d* of the wire structure 10 constitutes a hooking zone of the cap lifter 9 under at least one notch of the notched crown.

The cap lifter 9 also comprises a bearing zone 2*a* intended to bear on the upper part of the capsule, in the center of the capsule. The bearing zone 2*a* is a flat surface of the handle 2 located at its second end. The handle 2 may comprise two bearing zones 2*a*, each bearing zone 2*a* being inclined relative to the axis of the handle. The two bearing zones 2*a* are advantageously symmetrical with respect to the longitudinal axis of the handle 2 (FIG. 4). For optimal positioning of the cap lifter 9 on the capsule, the angle of inclination between each bearing zone 2*a* and the longitudinal axis of the handle is comprised between 30° and 60°.

The free rotation of the wire structure 10 also makes it possible to suspend and hook the knife 1 to a support.

To facilitate the passage of the central radial portion 10*d* under the capsule, the wire has a diameter less than 3 mm, in particular 2 mm, and preferably comprised between 1.5 and 1.8 mm.

Finally, the wire 10 is advantageously cylindrical (of circular section), which has the advantage that the wire does not slip under the capsule. The central transverse portion 10*d* is advantageously cylindrical and rectilinear, which allows better grip of the capsule by the cap lifter, and thus the cap lifter 9 does not escape during the cap lifting operation.

Figure 6:
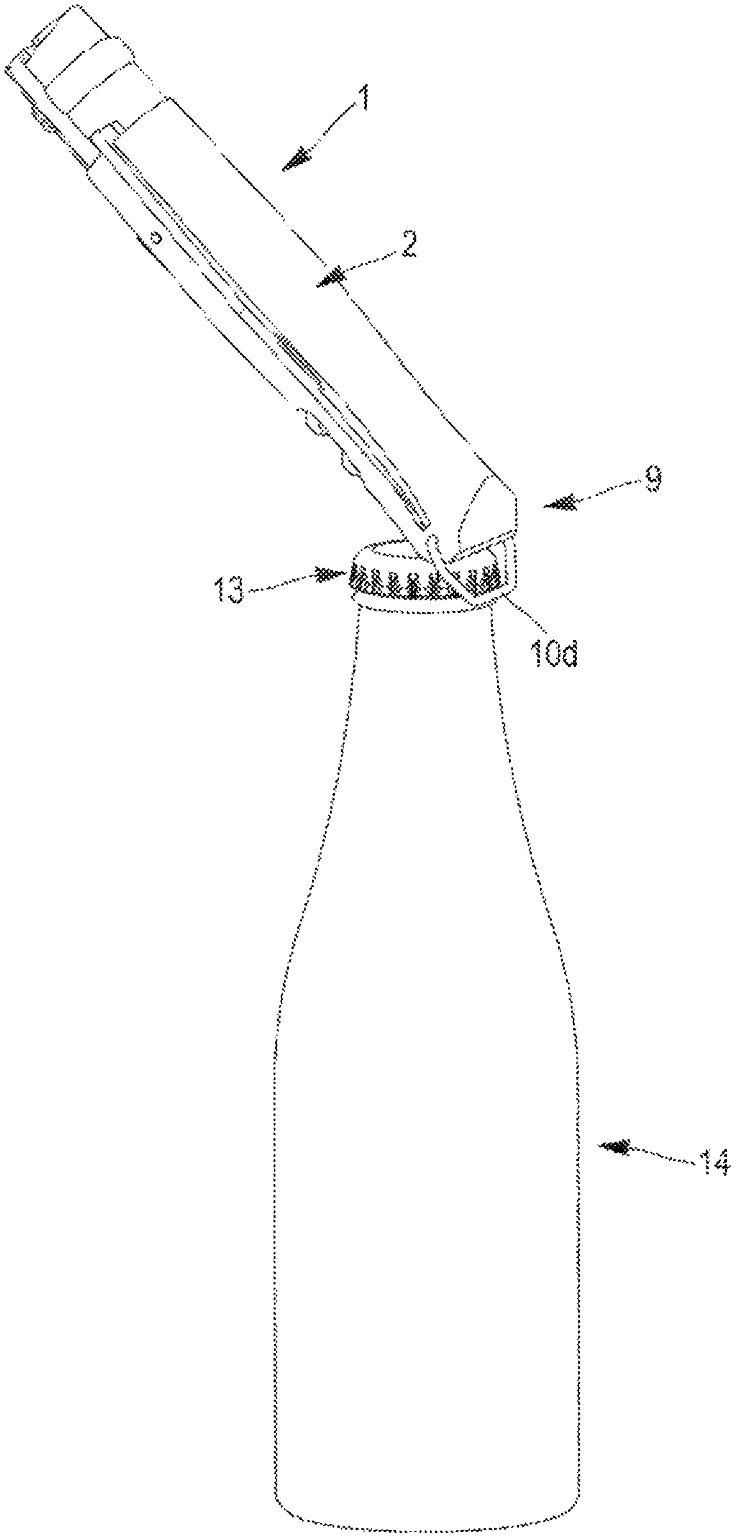
FIG. 6 is a view illustrating the cap lifting of a bottle using the knife in FIG. 1.

FIG. 6 illustrates the knife 1 in the operational configuration of the cap lifter 9.

A capsule 13 of a bottle 14 is engaged in the aperture 11 of the cap lifter 9. The wire structure 10 being mounted to freely rotate about the handle 2, the cap lifter 9 can easily and naturally be positioned on the capsule 13, and a self-centering of the cap lifter 9 on the capsule 13 is in particular obtained.

The user engages the capsule 13 in the aperture delimited by the wire structure, so that the rectilinear transverse portion 10*d* bears under the crown of the capsule 13 and a bearing face 2*a* of the handle 2 rests in the center of the capsule 13. By a pressure from bottom to top, the rectilinear transverse portion 10*d* drives a few teeth, which deforms the metal and releases the clamped glass neck.

The invention claimed is:

1. A knife comprising a handle with a longitudinal axis and a blade rotatably mounted at a first longitudinal end of the handle, between a position deployed outside the handle and in the alignment thereof, and a folded position in a space provided in the handle, the knife further comprising a cap lifter, the cap lifter being placed at a second longitudinal end of the handle, the cap lifter comprising a wire structure mounted to freely rotate about an axis orthogonal to the longitudinal axis of the handle, the wire structure defining with the handle a closed contour delimiting a cap lifting aperture intended to receive a capsule, and in that the cap lifter comprises a bearing element allowing bearing of the cap lifter on an upper part of the capsule, said bearing element being formed by a bearing zone of the handle, and a hooking element allowing the hooking of the cap lifter under the capsule, said hooking element being formed by a rectilinear transverse portion of the wire structure, wherein the bearing zone of the handle is a flat surface of the handle, arranged at the second longitudinal end of the handle and inclined relative to the longitudinal axis of the handle.

2. The knife according to claim 1, wherein the wire structure consists of a bent metal wire.

3. The knife according to claim 2, wherein the wire structure is flat and in that the wire is of circular section.

4. The knife according to claim 3, wherein a diameter of the wire is less than 3 mm.

5. The knife according to claim 3, wherein a diameter of the wire is comprised between 1.5 and 1.8 mm.

6. The knife according to claim 1, wherein the wire structure successively comprises, from the second longitudinal end of the handle and moving away longitudinally from said second longitudinal end: a) two transverse end portions each engaged in a transverse housing of the handle, b) two longitudinal portions each connected upstream to a transverse end portion, c) two inclined portions in the direction of the longitudinal axis of the handle and each connected upstream to a longitudinal portion, and d) said transverse rectilinear portion which is connected to the two inclined portions.

7. The knife according to claim 1, further comprising a first ferrule, called a fixed ferrule, in the form of a split ring, fitted to the first end of the handle and crossed by a rotation rod on which the blade is rotatably mounted, and a second ferrule, called a rotating ferrule, in the form of a split ring, arranged at the first end of the handle at the level of the axis of rotation of the blade, concentrically with the fixed ferrule, and capable of rotating on itself along the longitudinal axis of the handle.

8. The knife according to claim 1, further comprising a storage recess in which a corkscrew is arranged.

9. A use of a knife according to claim 1 for the cap lifting of a bottle.

* * * * *